(12) United States Patent
Cucurella Ripoli (10) Patent No.: US 8,397,497 B2
(45) Date of Patent: Mar. 19, 2013

(54) SYSTEM FOR MULTIPLE HARNESSING AND COMPLEMENTED CONVERSION OF ENERGY FROM SEA WAVES

(75) Inventor: Abel Cucurella Ripoli, Cerdenyola del Valles (ES)

(73) Assignee: Pipo Systems, S.L., Vigo (ES)

( * ) Notice: Subject to any disclaimer, the term of this patent is extended or adjusted under 35 U.S.C. 154(b) by 901 days.

(21) Appl. No.: 12/226,189

(22) PCT Filed: Apr. 12, 2007

(86) PCT No.: PCT/IB2007/052397
§ 371 (c)(1),
(2), (4) Date: Jun. 19, 2009

(87) PCT Pub. No.: WO2007/116384
PCT Pub. Date: Oct. 18, 2007

(65) Prior Publication Data
US 2010/0064678 A1    Mar. 18, 2010

(30) Foreign Application Priority Data
Apr. 12, 2006  (ES) .................................. 200601021

(51) Int. Cl.
*F03B 13/18* (2006.01)
*F03B 13/26* (2006.01)
*F03B 13/10* (2006.01)
*H02P 9/04* (2006.01)

(52) U.S. Cl. ................ 60/497; 60/501; 60/505; 290/42; 290/53

(58) Field of Classification Search ............ 60/495–497, 60/501, 502, 505, 507; 290/42, 53
See application file for complete search history.

(56) References Cited

U.S. PATENT DOCUMENTS
7,076,949 B2 * 7/2006 Fernandez Gomez et al. . 60/498

FOREIGN PATENT DOCUMENTS
| DE | 103 55 245 A1 | 6/2005 |
| ES | 2 224 832 | 10/2005 |
| WO | WO-2004/113718 A1 | 12/2004 |
| WO | WO-2005/005244 A1 | 1/2005 |
| WO | WO-2005/103485 A1 | 11/2005 |

* cited by examiner

*Primary Examiner* — Kenneth Bomberg
*Assistant Examiner* — Christopher Jetton
(74) *Attorney, Agent, or Firm* — Finnegan, Henderson, Farabow, Garrett & Dunner, L.L.P.

(57) ABSTRACT

System for multiple harnessing and complemented conversion of energy from sea waves, which includes a structure of vertical guides (12) along which a floating body (1) moves, and a first submerged tank (2) of captive gas (3), held up by said floating body (1), characterized in that it includes a second submerged tank (5) with captive gas (3), attached to said floating body (1), with said first tank (2) and second tank (5) being connected to each other, in such a way that they exchange their respective volumes of gas (3) due to the effect of changes of pressure of water column (4) caused by the waves. Improves the energy harnessing performance of the system.

6 Claims, 6 Drawing Sheets

SYSTEM FOR MULTIPLE HARNESSING AND COMPLEMENTED CONVERSION OF ENERGY FROM SEA WAVES

The present invention relates to a system for multiple harnessing and complemented conversion of energy from sea waves.

BACKGROUND OF THE INVENTION

Systems for generating energy from sea waves are known that are based on utilisation of the buoyant forces that act on a floating body anchored or ballasted to the bottom of the sea. The working travel that the floating body carries out due to the action of the buoyant forces is used in order to obtain energy.

Such simple systems that harness energy by flotation nevertheless have the disadvantage that the travel used to harness power proportionally reduces the travel devoted to carrying out work. The capacity of buoyant generators is for this reason always limited by the dimensions of the floating body that are in their turn subject to the height, longitude and frequency per minute of the waves.

Energy generation systems that take advantage of buoyant forces are clean and simple systems, but are so far not very competitive, if account is taken of their necessary dimensions and low energy harnessing. These are techniques that require a marked increase in the harnessing and conversion of energy to make the installation profitable.

Spanish patent ES2224832 describes a system for multiple harnessing and complemented conversion of energy from sea waves that has the advantage over other systems that, in addition to harness energy due to the actual impulse of the waves on the floating body, it enables harnessing of energy due to the pressures of the water column on the captive air in a submerged tank, which is open at its base and moves in a direction opposite to that of the floating body.

In the system described in the aforesaid patent, the complemented action between the floating body and the submerged tank, an action that has its source in pressure changes of the captive air that the tank contains, due to changes in the water column that it supports, shows itself in a complemented conversion of energy. Said complemented conversion tends to increase the intensity of the force throughout the entire travel of the waves, in both the ascending and descending directions, so that the effective working travel of the floating body is increased and, with it, the energy harnessing capacity of the system.

However, the great inertia that has to be overcome by the movements of water produced by the submerged tank of the system of the aforesaid patent shows itself in large hydrodynamic losses that greatly reduce the capacity to increase energy harnessing. Said system therefore needs to be improved.

DESCRIPTION OF THE INVENTION

The objective of the present invention is to develop a system for multiple harnessing and complemented conversion of energy from sea waves, which reduces to the utmost the hydrodynamic losses from the system of the state of the art without this involving a significant loss of the capacity for increasing the harnessing of energy.

In accordance with this objective, the system of the present invention comprises a floating body, means for converting the movement of the system into pneumatic, electrical or hydraulic energy, means for transmitting said energy to firm land or to a structure, a structure of vertical guides along which said floating body moves, a first submerged tank with captive gas, open at its lower base, held up by said floating body and also able to move along said structure of vertical guides, means of transmission of the movement of said floating body to said submerged tank, with said body and tank being arranged such that the movement of the submerged tank is in the opposite direction to that of the floating body, with the movement of the floating body and submerged tank being transmitted through means of transmission of the movement to said means of converting the movement into pneumatic, electrical or hydraulic energy. The system is characterised in that it includes a second submerged tank with captive gas, open at its lower base, said second tank being integrally attached to said floating body in such a way that it moves in the same direction as said body, and in that said first tank and second submerged tank are connected to each other in such a way that they exchange their respective volumes of gas under the effect of the changes of pressure of water column caused by the waves.

Preferably, said captive gas is air.

The basic effect on the system of the presence of the two aforesaid submerged tanks is to permit a reduction of the loss of power due to the inertia of the movement of water caused by the wave impulses, without this negatively affecting the capacity for increasing the energy harnessing of the system.

The described effect is due to the fact that with both submerged tanks being interconnected and so arranged that they move in the opposite direction under the effect of the waves, the changes of pressure of water column caused by said waves and the exchange or transfer of volumes of air are both duplicated. This has the special feature of generating in each of said tanks forces (thrusts in the ascents and masses in the descents) that are added to each other and transmitted in their entirety to the floating body, both in the ascent and in the descent, and that therefore complement with the same intensity the buoyant forces that act directly on said floating body.

Thus, the complemented action that was exercised in the state of the art between the floating body and a single submerged tank of variable volume, is now exercised by means of two interconnected submerged tanks, with the result that the losses of power due to the inertia of the movements of water are enormously reduced, and the energy output yield is very much greater.

Surprisingly, with the system of the present invention it is possible to achieve a very high energy absorption performance when working with very small waves, for example, with waves from 0.5 meters. Thanks to this, unlike other systems of the state of the art, the system of the invention is viable in zones such as the Mediterranean sea where the waves are small but plentiful, and there is a very high demand for energy.

The presence of the two submerged tanks also lends the system the advantage of being highly sensitive to pressure changes of the water column, so that any small surface variation doubles the water column, leading to exchanges of gases and volumes between said tanks. Thus, from practically the start of the working travel of the floating body the forces that are generated act at their maximum intensity, complementing the buoyant forces and the work of the system.

According to one embodiment of the present invention, said system includes a third submerged tank with captive gas, open at its lower base, and attached to said structure of vertical guides, a second floating body integrally attached to said first floating body, with said second floating body being housed inside said third submerged tank in such a way that it floats on its interior liquid surface simultaneously with and in parallel to said first floating body, with the volume of gas of said third tank being interchangeable with the volume of gas of at least one exterior receptacle under the effect of the pressure changes of water column caused by the waves.

In the aforesaid embodiment, the body housed inside the third tank constitutes a second submerged buoy that floats on the interior liquid surface of the third tank simultaneously with and parallel to the first buoy or floating body that is on the surface. Said second submerged buoy thus constitutes a second volume harnessing surface that allows the buoyant work carried out on the vertical spindle of the system to be increased, without need to have a buoy of large size on the surface.

As is known, for a floating body to take the utmost advantage of the potential working travel offered by the wave, the length of said body must not exceed 50% of the wavelength of the mean wave at a given point in the sea, i.e. that it does not exceed the length from the crest to the trough of the wave. The arrangement of two buoys or floating bodies at two levels that is described in the aforesaid embodiment, one at the surface and the other submerged, has the advantage of allowing maximum advantage to be taken of the entire travel offered by the waves, while at the same time maintaining a buoyant working surface equivalent to that of a large-size, low-travel buoy or floating body at the surface.

Another advantage of the embodiment described lies in the fact that the system thus has three buoyant actuators that in the form of a thrust or mass work at their three levels on a single spindle (a first floating body at the surface, a second submerged floating body and an actuator made up of the first and second submerged tanks together).

According to another embodiment of the present invention, said exterior receptacle is at least another third submerged tank with captive gas provided in at least one adjacent module of the system and interconnected with said third submerged tank, with said adjacent module likewise including a first floating body and said first and second submerged tanks with captive gas.

This embodiment has the advantage that the transfer of captive gas is carried out between at least two third submerged tanks, each one of them belonging to a module of the system, which encourages an instantaneous and continuous transfer of gases (therefore, a speedy and nearly friction-free change of water levels) and the movement of each one of the submerged buoys in the aforesaid tanks of each module.

Indeed, during periods of calm sea, the interior gas/water level of the third tanks will be the same for each module. With the movement of the sea, however, said interior gas/water level will vary in each module differently but simultaneously and in parallel with the surface variations under the effect of the action of the waves. This will facilitate an exchange of gases from one tank to another and, thereby, the ascending and descending movement, with hardly any friction, of each one of the buoys or submerged floating bodies contained by the third tanks of each module, remaining attached to the buoys that float on the free surface of the sea.

Preferably, the means of converting the movement into energy are provided in a structure above said structure of vertical guides. It is thus very easy to isolate said means of conversion from the corrosive action of the sea water, thereby facilitating maintenance of the system.

Also preferably, said means of transmission of the movement include a toothed rack integrally attached to at least said first floating body and some gearwheels provided in a watertight compartment provided in said structure above said structure of vertical guides, with the length of said toothed rack being suitable for meshing with said gearwheels. This arrangement therefore likewise minimises the corrosive action of the sea water on said means of transmission of the movement.

Again preferably, said means of converting the movement into energy include at least one electrical generator, or a pneumatic pump or hydraulic pump.

BRIEF DESCRIPTION OF THE DRAWINGS

For a better understanding of all that has been outlined some drawings are attached that show, schematically and solely by way of non-restrictive example, two practical cases of embodiment.

In said drawings,

FIG. 1 corresponds to the system in the calm-sea position,

FIG. 2, crest-of-the-wave position, and

FIG. 3, in trough-of-the-wave position.

FIG. 4 corresponds to the system in the calm-sea position,

FIG. 5 in crest-of-the-wave position, and

FIG. 6 in trough-of-the-wave position.

DESCRIPTION OF TWO PREFERRED EMBODIMENTS

Figure 1:
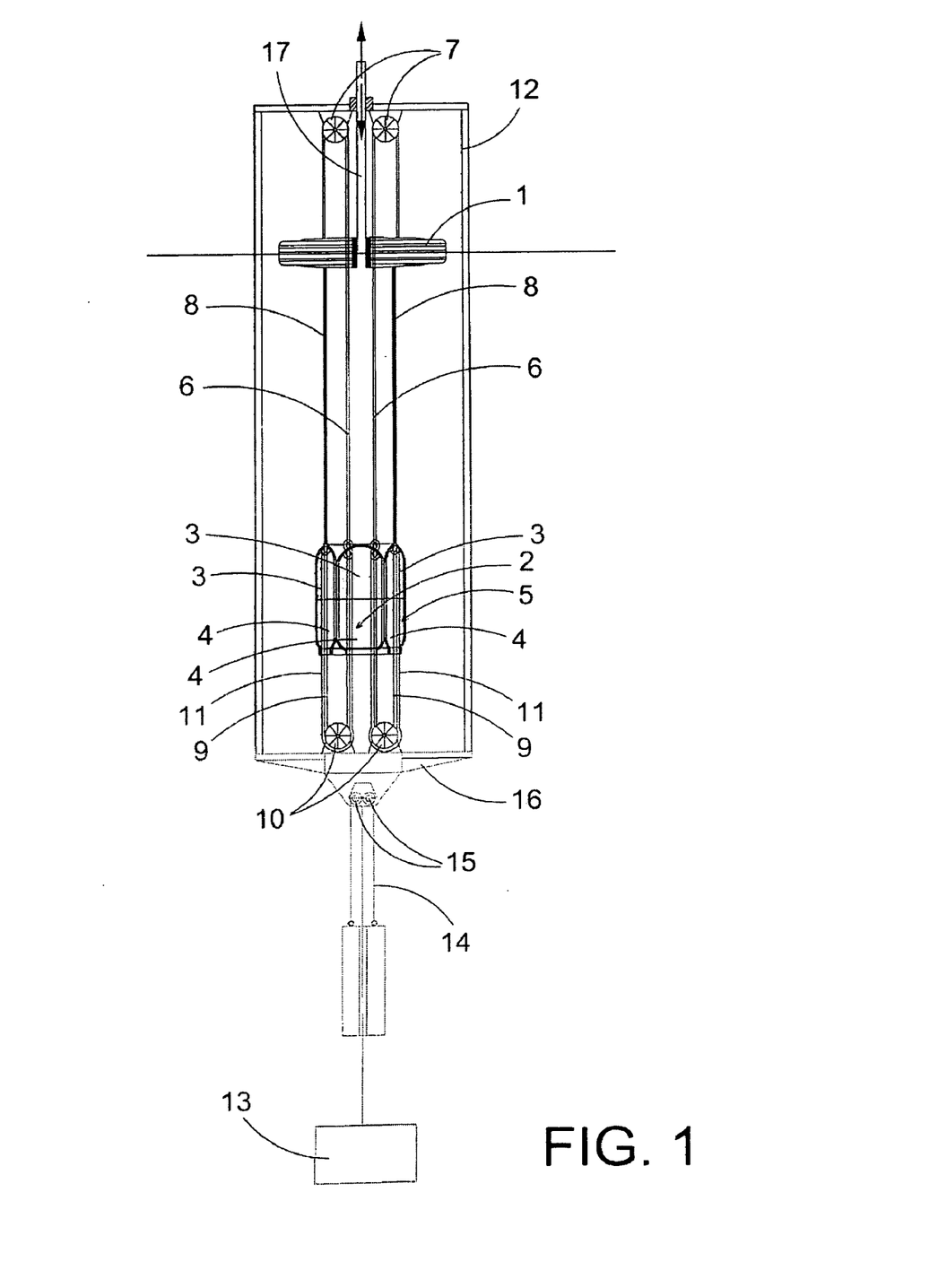
FIGS. 1, 2 and 3 are schematic elevation views of a first preferred embodiment of the system of the invention that includes the first floating body and said first and second submerged tanks.
Figure 2:
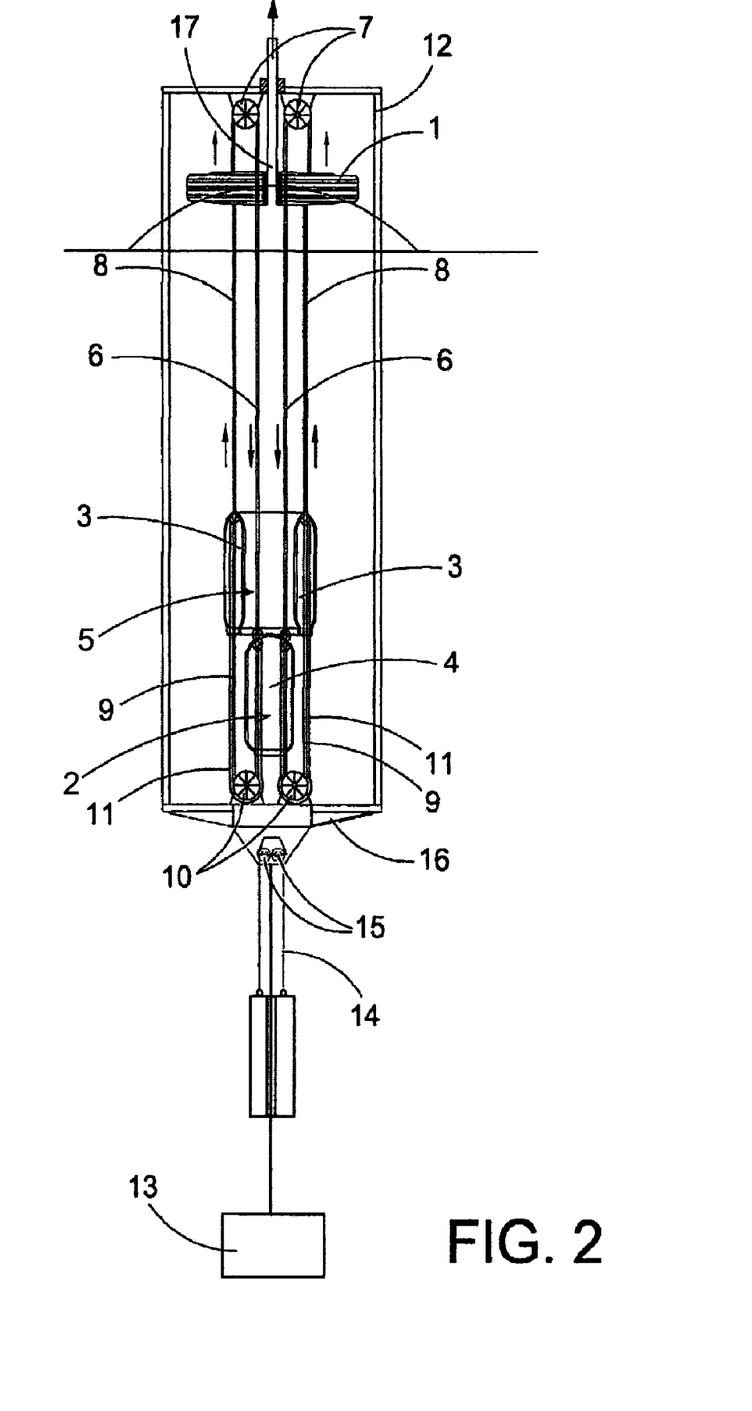
Figure 3:
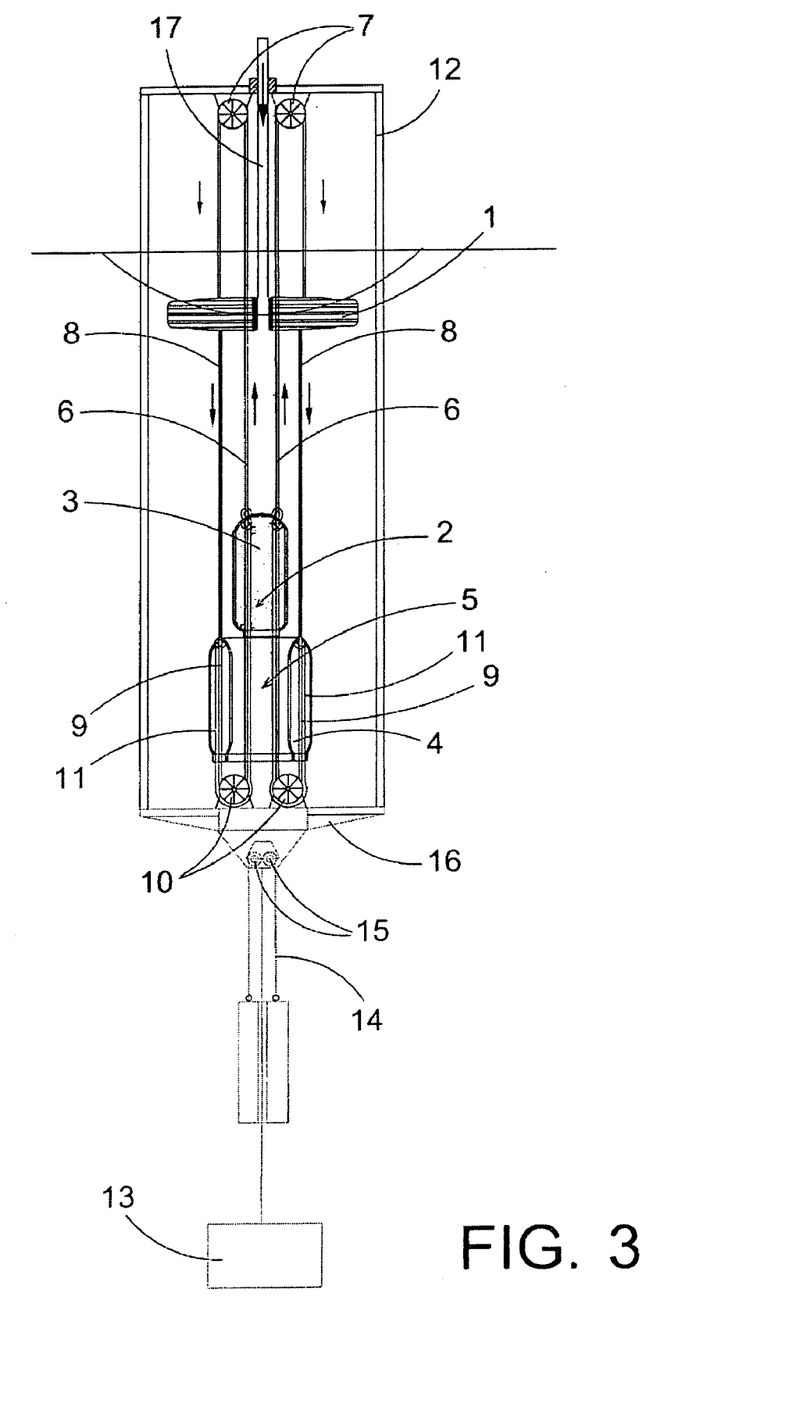

FIGS. 1, 2 and 3 show a first preferred embodiment of the system that includes a floating body 1 at the surface, a first semi-spherical submerged tank 2 with captive air 3, open at its lower base to permit the entry of sea water 4, and a second ring-shaped submerged tank 5, of the same capacity, also open at its base and with captive air 3 inside it.

The floating body 1 holds up the semi-spherical submerged tank 2 via the cables 6 and the pulleys 7, and the second ring-shaped tank 5 by means of the bars 8. As regards said first tank 2 and second tank 5, they are attached to each other by means of the cables 9 and pulleys 10, along which there also pass the flexible tubes 11 through which the exchange of volumes of air 3 from said tanks 2, 5 is carried out.

Both the floating body 1 and the submerged tanks 2, 5 move vertically along the structure of vertical guides 12 to which the pulleys 7 and 10 are attached. Said structure of vertical guides 12 keeps the floating body 1 and the submerged tanks 2, 5 tensioned and aligned in order to prevent lateral movements.

The structure of vertical guides 12 is anchored by its lower part to some concrete structures 13 placed on the bed of the sea using the chains 14 and pulleys 15 that constitute a dual gravity anchorage system that will only come into operation under extreme sea conditions and in order to compensate tides.

The same structure of vertical guides 12 has on its lower base a compensatory plate 16, that acts as a dynamic anchorage of the work forces, helping to maintain the position of the floating body 1 and the tanks 2, 5 in each change of direction.

The floating body 1 and the second ring-shaped tank 5 are integrally attached to each other by the bars 8, so the direction in which both bodies move will always be the same. The first tank 2, on the other hand, due to being attached to the floating body 1 and the second tank 5 through the pulleys 7, 10 and the cables 6, 9, will always move in a direction opposite to that of the floating body 1 and of the second tank 5.

Thus, when the floating body 1 ascends or descends under the effect of the action of the waves, the second submerged tank 5 or ring-shaped tank also does so, while the first submerged tank 2 or semi-spherical tank descends or ascends, respectively.

As the figures show, the floating body 1 is integrally attached to a spindle 17 that is in turn attached from its interior to a toothed rack, not shown, which meshes in each of its sides with two wheels that convert the movement of the floating body 1 along said rack into a rotary movement of two spindles with a certain working torque. Said rotary movement is transmitted to a rotation inverter with one-directional output, which transmits the movement of a single drive spindle and the working power to a multiplier whose final output is regulated by a continuous speed variator that maintains the rotations within a limited r.p.m. band and transmits them to an inertia flywheel. The movement of the drive spindle can be transmitted finally to one or two spindles which according to the potential of the waves drive one or two electrical generators, one or two pneumatic energy compressors, one or two hydraulic pumps that supply inverse osmosis membranes for the desalination of sea water, or for example, drive equipment for producing hydrogen.

In the embodiment described, the gearwheels, together with the other components of the mechanical transmission system and the components of the movement-to-energy conversion system, are mounted in a watertight compartment fitted in an outer structure, not shown. Said components are thus protected from the direct, corrosive action of the sea water.

As has been noted, the system described constitutes an improvement of the system of multiple harnessing and complemented conversion of energy of the state of the art, which pursues a reduction of the hydrodynamic losses caused by the movements of the masses of water of the system.

In order to achieve said objective, and as can be seen in the enclosed Figures, two tanks 2, 5, have been arranged, interconnected by the tubes 11 through which transfer of air 3 between tanks 2, 5 is carried out.

As shown in FIG. 1, in calm-sea position, the water/air level of both submerged tanks 2, 5 is the same.

In crest-of-wave position (FIG. 2) the floating body 1 ascends driven by the energy of the sea waves, transmitting their movement to both submerged tanks 2, 5, through the cables 6 and the bars 8. The first semi-spherical tank 2 moves in a direction opposite to that of the floating body 1, so that when the body 1 ascends, said submerged tank 2 moves away from the surface with the result that, as the water column that it supports increases, the captive air 3 that it contains is transferred to the second ring-shaped tank 5, which also ascends towards the surface dragged by the bars 8 that keep it attached to the floating body 1.

The transfer of air 3 towards the second ring-shaped tank 2 that takes place during the ascent of the wave generates forces in both tanks (increase of weight in the semi-spherical tank 2 and increase of thrust in the annular tank 5) that are transmitted to the floating body 1 through the cables 6 and the bars 8, and are added (complement) the thrust power generated by the impulse of the waves (buoyant forces).

In the trough-of-wave position (FIG. 3), the floating body 1 descends under the effect of the waves and so too does the annular tank 5 that is attached to it by means of the bars 8. As said annular tank 5 gains water column 4, the air 3 that it contains is transferred to the semi-spherical tank 2, which ascends towards the surface dragged by the cables 6 and the pulleys 7 that secure it.

The transfer of air 3 towards the first semi-spherical tank 2 that takes place during the descent of the wave generates in both tanks some forces (increase of thrust in the semi-spherical tank 2 and increase of weight in the annular tank 5) that are transmitted to the floating body 1 through the cables 6 and the bars 8, and are added (complement) to the power generated by the descent of the waves (mass of the floating body).

In the present invention, the complemented action that is exercised in the state of the art between the floating body 1 and a single submerged tank, which action showed itself in an increase in the effective work carried out by the system during the ascent and descent of the waves, is now exercised between the floating body 1 and two interconnected submerged tanks 2, 5, arranged so as to permit a significant reduction of the power losses produced by the inertia of the movements of water and, as a result, a significant increase in the energy output of the system.

Figure 4:
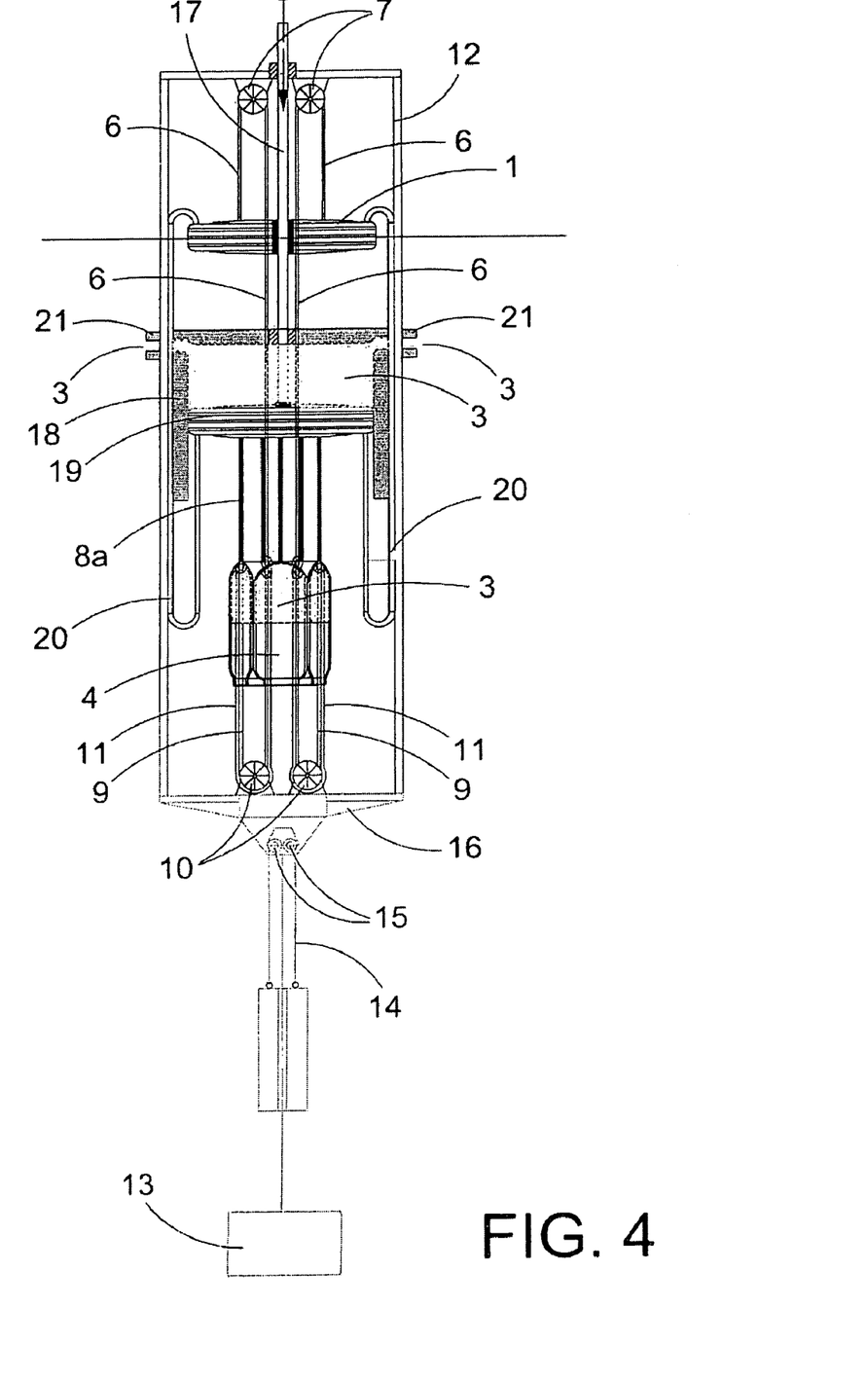
FIGS. 4, 5 and 6 are schematic elevation views of a second preferred embodiment of the system that includes, in addition to the first floating body and said first and second submerged tanks, a third submerged tank with a second floating body.
Figure 5:
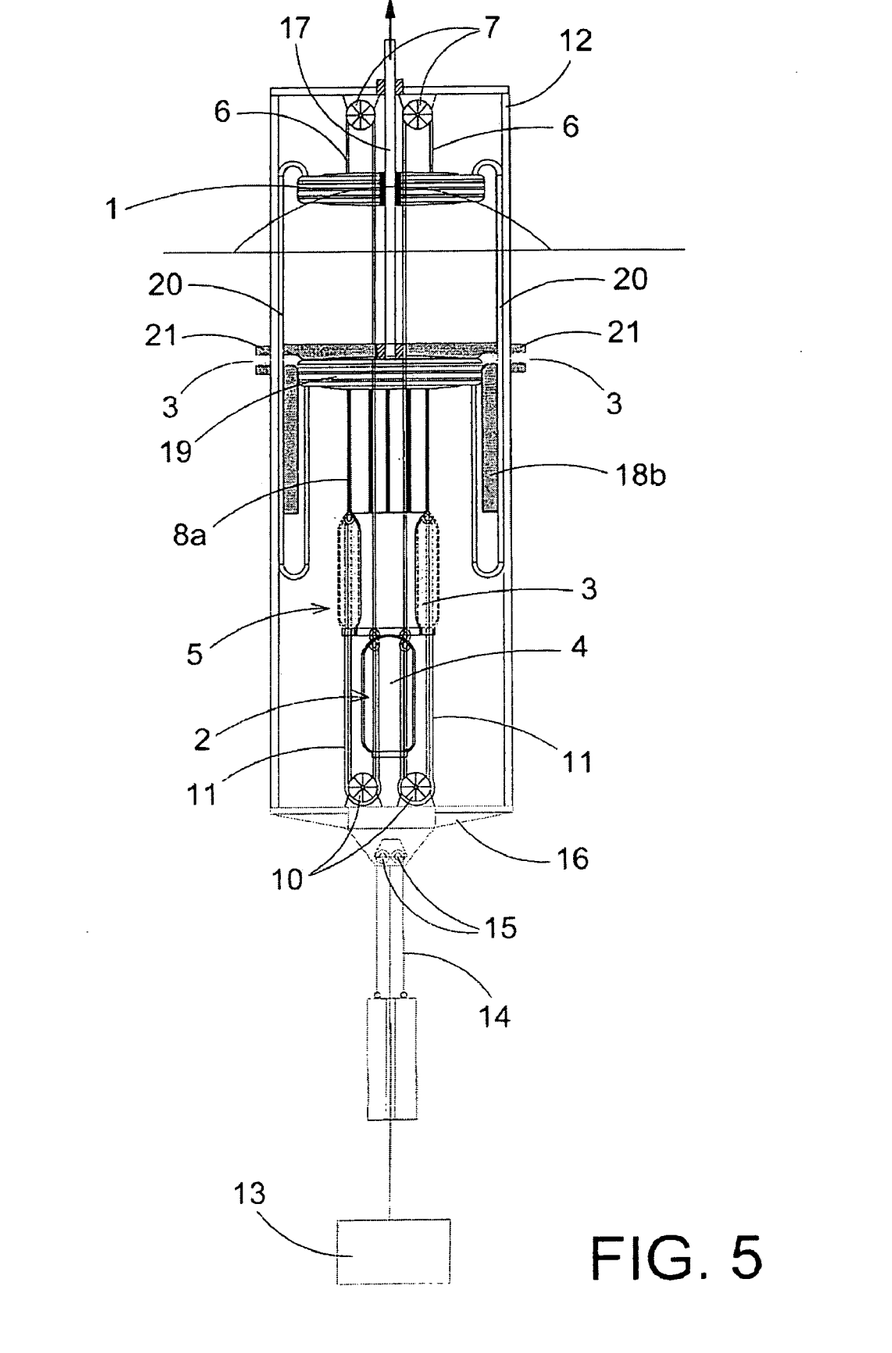
Figure 6:
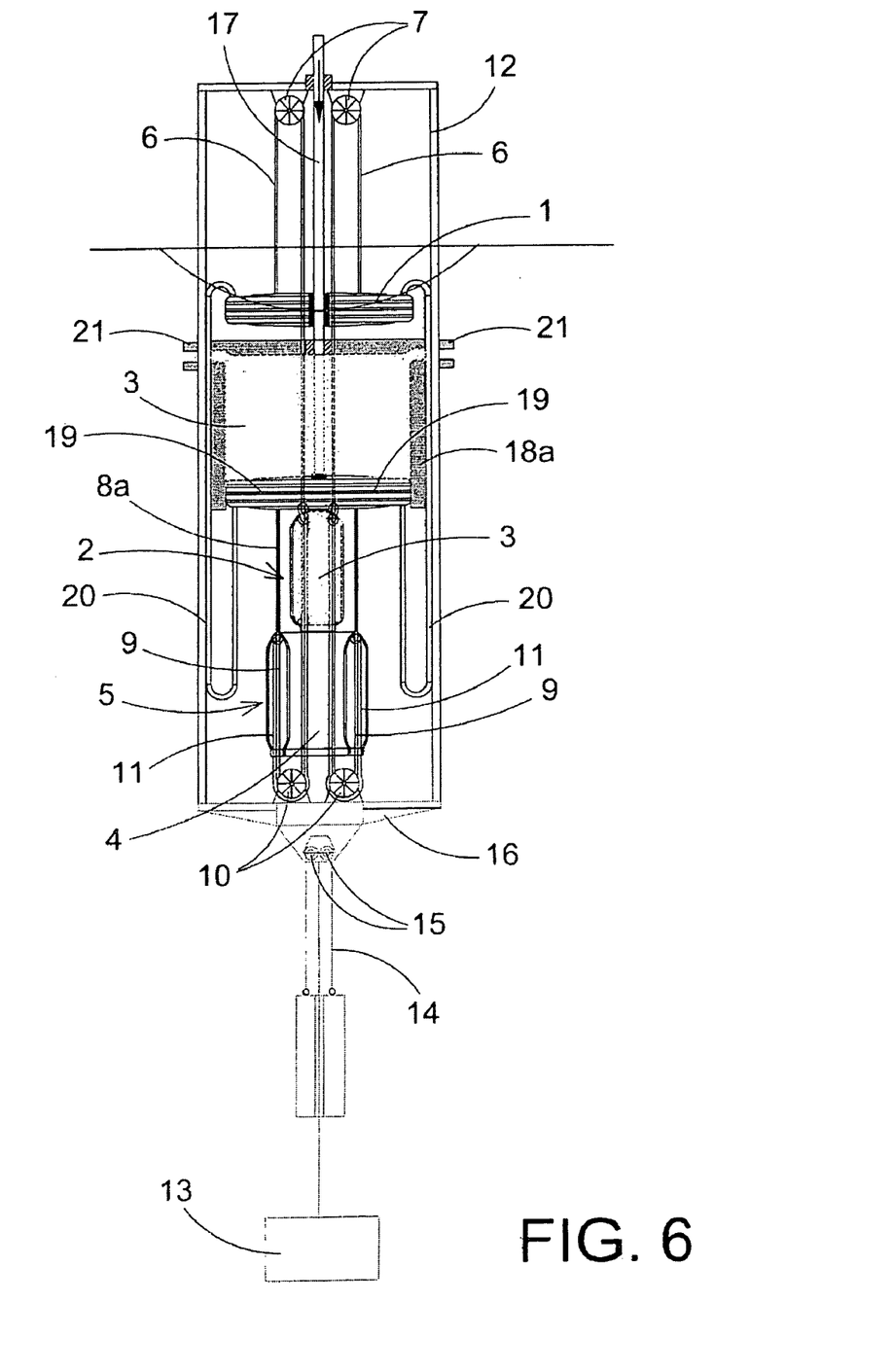

FIGS. 4, 5, and 6 show a second preferred embodiment of the present invention in which, between the floating body 1 and the submerged tanks 2, 5, a third submerged tank 18 has been mounted fixed to the structure of vertical guides 12. Said third tank 18 also contains captive air 3 inside it and is open at its base, but has the special feature of including inside it a second body 19 that floats on the liquid surface in parallel and simultaneously with the floating body 1 to which it is attached by means of the spindle 17 and the peripheral bars 20.

As can be seen in FIGS. 4, 5, 6, said third tank 18 has two upper openings 21 through which the air 3 that it contains can be transferred to an exterior receptacle, not shown, or to a third tank 18 provided in an adjacent module of the system.

The captive air that the third tank 18 contains is provided at the right pressure so that its volume occupies up to 50% of the capacity of said tank. The floating body 19 housed inside it will thus be able to move simultaneously and in parallel with the exterior buoy 1, making use of the changes of surface pressure level and of water column caused by the waves.

As was noted in the description of the invention, the second submerged floating body 19 constitutes a second buoy or buoyant surface on which the forces of the sea waves will act, transmitted to it by atmospheric pressure and, therefore, a second surface that will permit the work carried out on a single spindle 17 to be increased. Thus, with two small buoys 1, 19 that allow utmost advantage to be taken of the potential travel of the waves (crest-trough), the same buoyant working surface is obtained but with greater travel than would be obtained with a single exterior buoy of larger dimensions, which would be much more difficult to move through the waves.

In the embodiment described, the floating body 1, the submerged floating body 19 and the second annular tank 5 are integrally attached to each other by means of the spindle 17, the peripheral bars 20 and the bars 8a, so that all of them move in the same direction. On the other hand, the semi-spherical submerged tank 2 moves in an opposite direction, since it is attached to the floating body 1 and to the annular tank 5 by means of the cables 6, 9 and the pulleys 7, 10.

In calm-sea position (FIG. 4), the interior water/air level of the tank 18 is kept at medium height and the buoy 19 at an intermediate position in said tank 18.

With the movement of the sea water (FIGS. 5, 6), however, said interior level of water/air will vary, which will facilitate exchange of air 3 from one tank 18 to another sited in an adjacent module or in an exterior receptacle and, thereby, the ascending and descending movement, with scarcely any friction, of each one of the buoys 19 that said tanks 18 contain.

As can be seen in FIG. 5, in crest-of-wave position, the submerged floating body 19 has ascended under the impulse of the floating body 1 to which it is attached, leading to transfer of the air 3 towards the tank 18*a* of the adjacent module (FIG. 6). In said module, the floating body 1 is in trough-of-wave position (FIG. 6), so that the submerged floating body 19 has been forced to descend by the floating body 1 to which it is attached, thereby leading to the entry of air 3 from the tank 18*a* of the adjacent module that is in crest-of-wave position.

The almost instantaneous and continuous transfer of the volumes of air 3 of each one of the interconnected tanks 18*a*, 18*b* allows nearly friction-free buoyant work of the submerged buoys or floating bodies 19 of each of the modules.

Surprisingly, the system of the invention described in the embodiment of FIGS. 4, 5 and 6 has the advantage compared with the systems of the state of the art of achieving maximum energy output, since on the one hand it doubles the buoyant work and, on the other hand, it increases the real effectiveness of the work carried out during travel of the waves. All this thanks to the presence of the three buoyant actuators which in the form of thrust or mass work at their three levels on a single spindle (a first floating body at the surface, a second submerged floating body and an actuator constituted by the first and second submerged tanks together).

The invention claimed is:

1. A system for multiple harnessing and complemented conversion of energy from sea waves, comprising:
   a floating body;
   an energy converter that converts the movement of the floating body into pneumatic, electrical, or hydraulic energy;
   vertical guides along which the floating body moves,
   a first submerged tank comprising an open lower base and a captive gas, held up by the floating body and movable along the vertical guides; wherein the movement of the first submerged tank is in the opposite direction to the floating body; and wherein the movement of the floating body and the first submerged tank is transmitted to the energy converter;
   a second submerged tank comprising an open lower base and a captive gas integrally attached to the floating body; wherein the movement of the second submerged tank is in the same direction to the floating body; and
   wherein the first submerged tank and the second submerged tank are connected and exchange respective volumes of gas.

2. The system according to claim 1, further comprising:
   a third submerged tank comprising an open lower base and a captive gas, wherein the third submerged tank is attached to the vertical guides;
   a second floating body integrally attached to the first floating body;
   wherein the second floating body is housed in the interior of the third submerged tank in order to float on its interior liquid surface simultaneously with and parallel to the first floating body; and
   wherein the volume of gas of the third submerged tank is interchangeable with the volume of gas of at least one exterior receptacle.

3. The system according to claim 2, wherein the at least one exterior receptacle is another third submerged tank, which comprises an open lower base and a captive gas and is attached to the vertical guides, provided in at least one adjacent module of the system and interconnected with the third submerged tank attached to the vertical guides;
   wherein the adjacent module comprises a first floating body and first and second submerged tanks.

4. The system according to claim 1, wherein the energy converter is located above the vertical guides.

5. The system according to claim 4, wherein the energy converter comprises:
   a toothed rack integrally attached to at least the first floating body; and
   a watertight compartment comprising gearwheels provided above the vertical guides;
   wherein the length of the toothed rack is suitable to mesh with the gearwheels.

6. The system according to claim 4, wherein the energy converter is chosen from at least one electrical generator, at least one pneumatic pump, and at least one hydraulic pump.

* * * * *